United States Patent [19]
Powell et al.

[11] Patent Number: 5,238,021
[45] Date of Patent: Aug. 24, 1993

[54] DIAPHRAGM OPERATED SPRING LOADED REGULATOR

[75] Inventors: Walter W. Powell, Sugar Land; Louis R. Castaneda, Houston, both of Tex.

[73] Assignee: Groth Corporation, Houston, Tex.

[21] Appl. No.: 2,136

[22] Filed: Jan. 11, 1993

[51] Int. Cl.$^5$ .............................................. G05D 16/02
[52] U.S. Cl. ........................... 137/505.18; 137/505.22
[58] Field of Search ...................... 137/505.15, 505.18, 137/505.22

[56] References Cited

U.S. PATENT DOCUMENTS

| | | | |
|---|---|---|---|
| 353,081 | 11/1886 | Patterson | 137/505.22 |
| 3,001,550 | 9/1961 | Engel et al. | 137/505.18 X |
| 3,111,957 | 11/1963 | Broughton | 137/505.22 X |
| 3,392,749 | 7/1968 | Gneiding et al. | 137/505.18 X |
| 3,545,471 | 12/1970 | Taplin | 137/505.18 X |

Primary Examiner—Stephen M. Hepperle

[57] ABSTRACT

A diaphragm controlled spring loaded regulator is disclosed. Such regulator is adapted to regulate the flow of compressed gas applied to a gas blanket on top of liquids in a storage tank and to other low pressure applications. The regulator includes a piston in a valve body with an "O" ring seat contacting an annular seating surface of the valve body. A compression spring is located on one end of the piston and a diaphragm actuator responsive to remote tank pressure is provided on the other end of the piston. At closure, the piston is pressure balanced. One arrangement is provided with a rollout seal in combination with an upper piston part and tapered cylinder walls such that after the piston begins to open, increased opening force is created due to inlet pressure acting on the upper piston part. As the piston begins to close, increased closing force is created due to inlet pressure. Another arrangement is provided such that with cracking of the "O" ring seat with the annular seating surface, pressure is adjustably increased in the lower part of the valve so as to act against a lower part of the piston so as to increase opening force.

13 Claims, 3 Drawing Sheets

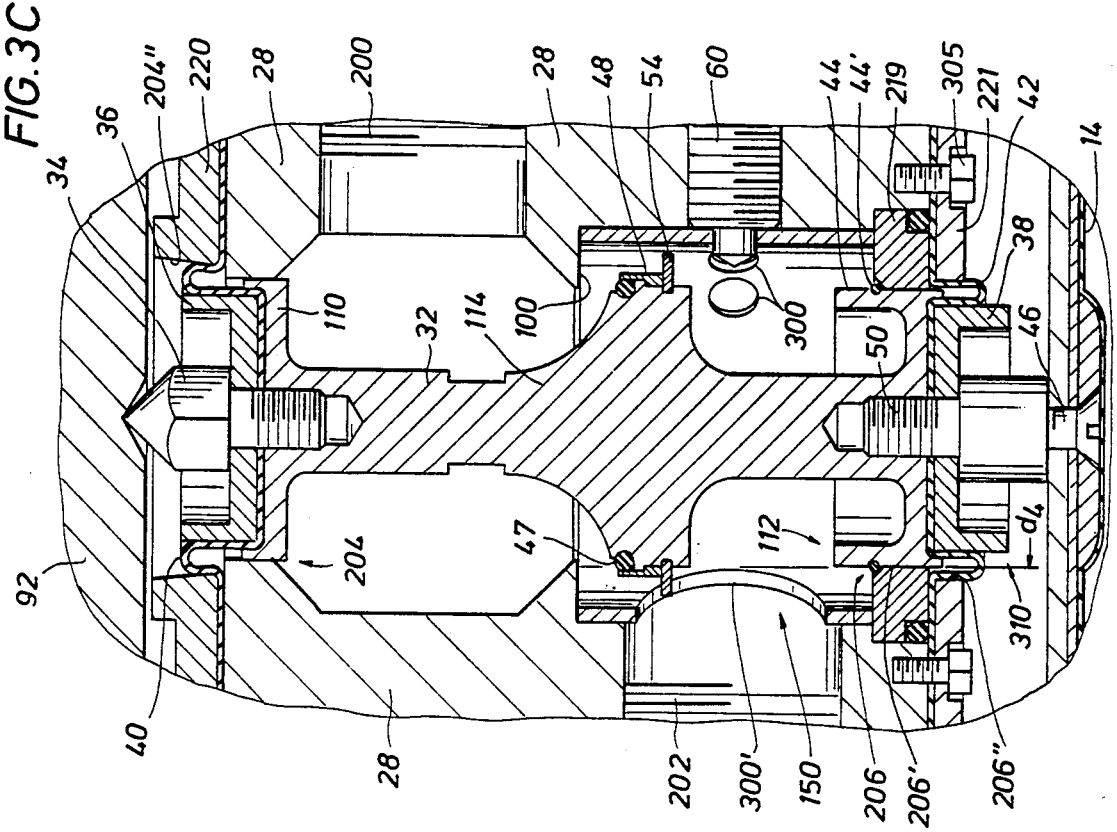
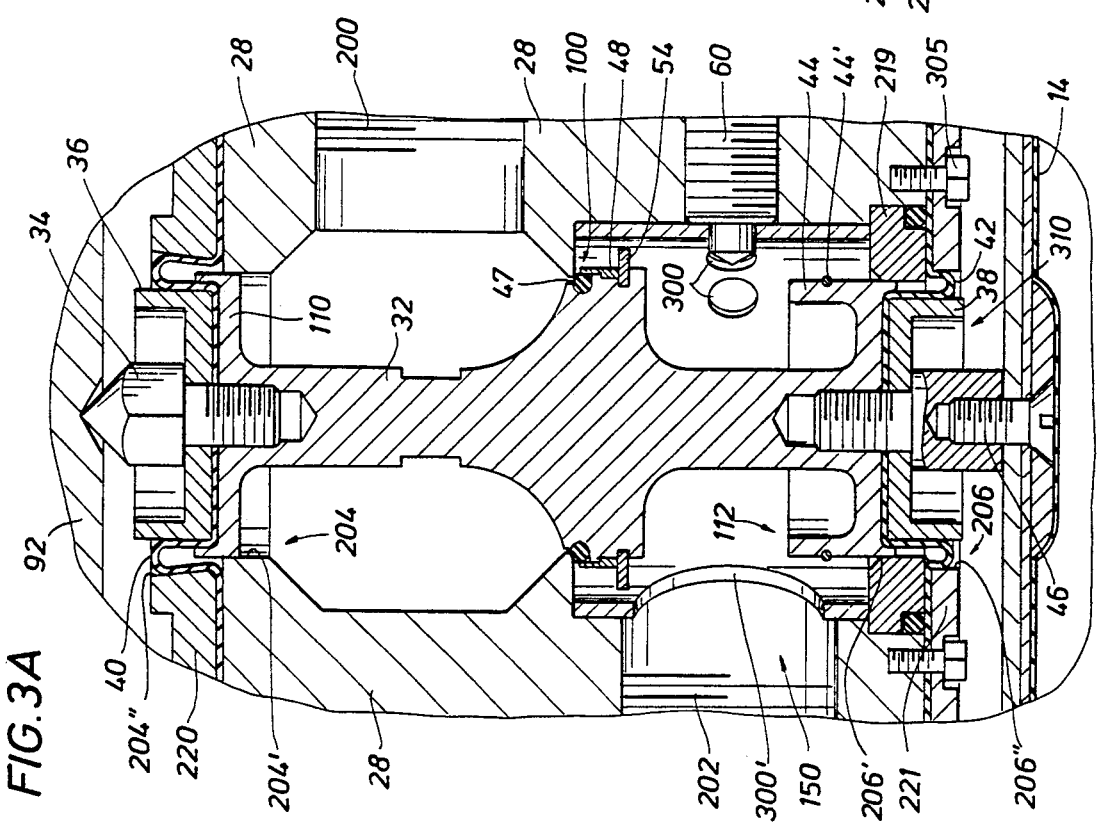

DIAPHRAGM OPERATED SPRING LOADED REGULATOR

BACKGROUND OF THE INVENTION

1. Field of the Invention

This invention relates generally to regulator valves. Specifically, the invention relates to a gas system regulator valve for use in maintaining preset pressure in piping or in a storage tank.

2. Description of the Prior Art

Many prior regulators have been designed and produced over the years. Such regulators in general have not been capable of reducing upstream pressure as high as 200 psi to a regulated downstream pressure as low as several inches of Water Column (WC) in a single device while providing exceptional stability, and high capacity.

3. Identification of Objects of the Invention

A primary object of this invention is to provide a regulator valve which can reduce upstream or supply pressure as high as 200 psi to a very low regulated downstream pressure in a single stage with high capacity while providing high opening and closing forces of the moving parts.

Another object of the invention is to provide a piston type regulator valve that is characterized by increased piston opening forces after the piston begins to open and increased closing forces as the piston begins to close.

Another object of the invention is to provide a regulator valve that provides additional increased opening forces after the valve has cracked open.

SUMMARY

The objects identified above as well as other advantages and features of the invention are incorporated in the regulator valve of this invention. A valve body of the regulator valve includes an inlet and an outlet and a centrally located annular seating area. The valve also includes a lower cylinder structure and an upper cylinder structure. The upper cylinder structure includes outwardly tapered walls as a function of increasing upwardly distance.

A valve piston is disposed for reciprocation within the valve body. It includes a central part with an "O" ring seat for closing against or cracking open from the annular seating area of the valve body, thereby closing or opening a fluid flow path between the inlet and outlet. The valve piston includes an upper piston element for reciprocation within the upper cylinder structure of the body and a lower piston element for reciprocation within the lower cylinder structure of the body.

A pressure actuator attached to the lower end of the body includes a pressure responsive diaphragm which is attached to the lower piston element. A spring bonnet attached to the upper end of the body includes a compression spring which acts downward on the upper piston element. An adjustment screw allows the downward force of the spring to be adjusted for a desired "set" pressure of the regulator. When the force of the diaphragm in response to remote pressure via a port in the actuator beneath the diaphragm is greater than the "set" spring force, the piston moves up until the "O" ring piston seat closes against the annular seating surface. When the force of the diaphragm is less than "set" spring force, the valve piston moves down and the fluid flow path from inlet to outlet opens.

A rollout diaphragm seal is fixed between the upper piston cylinder and the upper piston element of the valve piston. Once the upper piston element is moved downwardly a small distance, inlet pressure acts on the decreasing effective area of the rollout seal with respect to the tapered walls of the upper piston cylinder with the result that increased opening force is created. When the valve is open and starts to close a small distance, inlet pressure acts on the increasing effective area of the rollout diaphragm seal with respect to the tapered walls of the upper cylinder, with the result that increased closing force is created.

A lower rollout diaphragm seal between the lower piston element and the lower cylinder of the body has a greater diameter than that of the "O" ring piston seat. Accordingly, when the valve opens, increased pressure in the lower part of the valve acts on the difference in areas between the lower seal and the "O" ring piston seat, thereby providing a force tending to open the valve. A rotatable sleeve with a main orifice is placed in the flow path at the outlet of the valve. Fluid communication exists between such main orifice and the outlet. Rotation of the sleeve increases the pressure acting on the differences in seal areas with the result that reduced "droop" is achieved. Droop is defined as the difference in pressure between crack and full-open expressed in percent. Rotational positioning of the sleeve is controlled by a number of auxiliary orifices in the sleeve.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which:

FIG. 3A shows the piston of the valve in a closed position and in an enlarged view from that of FIG. 2.

FIG. 3C shows the piston of the valve in an open position and in an enlarged view from that of FIG. 2.

DESCRIPTION OF THE INVENTION

Figure 1:
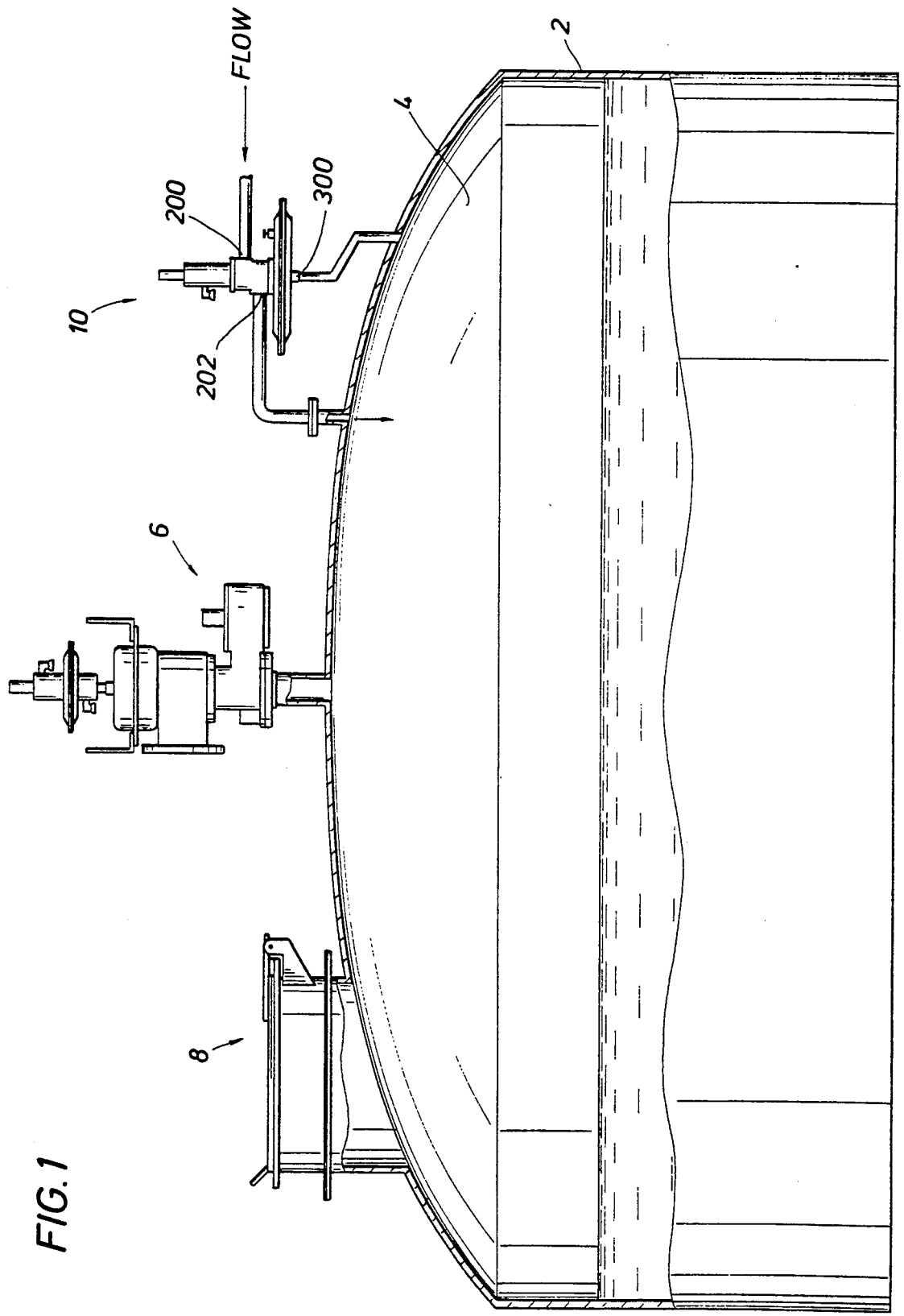
FIG. 1 illustrates a typical tank system in which a gas regulator valve, according to the invention, may be used to control the pressure of a gas blanket over liquids in the tank.

FIG. 1 shows a preferred application of the regulator valve 10 of the invention. Such valve, called a gas blanket regulator valve for the application depicted in FIG. 1, is disposed atop a storage tank 2 holding liquid chemicals, hydrocarbons or the like in which a gas blanket at a pre-selected pressure is applied in the tank above the liquid. Such gas might be nitrogen or some other non-flammable gas. Such gas must be supplied from a compressed source. The supply pressure might be as high as 200 psi. The pressure of the gas supply might desirably be as low as several inches of water column. Accordingly, the function of valve 10 is to apply gas to gas blanket 4 from a pressurized source (not shown) and regulate the pressure of the gas in the gas blanket. Such valve 10 accepts pressurized supply gas to its inlet 200 and applies it at a regulated pressure via its outlet 202 which is applied via a conduit to the gas blanket. The pressure of the gas blanket is sensed remotely and applied to valve 10 via remote sensing port 300. A desired regulated pressure may be "set" in valve 10. Such valve 10 compares the sensed pressure at port 300 with a "set" pressure and opens to apply gas when the sensed pressure is below set pressure, but closes when the sensed pressure is equal to or above set pressure.

Other safety devices typically found for use with storage tanks are pilot operated relief valves or weight loaded breather valves 6 and emergency relief valves 8. Such valves are not part of the invention.

FIGS. 2, 3A–3D illustrate the invention incorporated in the preferred embodiment of the regulator valve 10. The regulator valve described below which embodies the invention as defined by the claims below may be used for applications other than for storage tanks.

THE VALVE BODY

Figure 2:
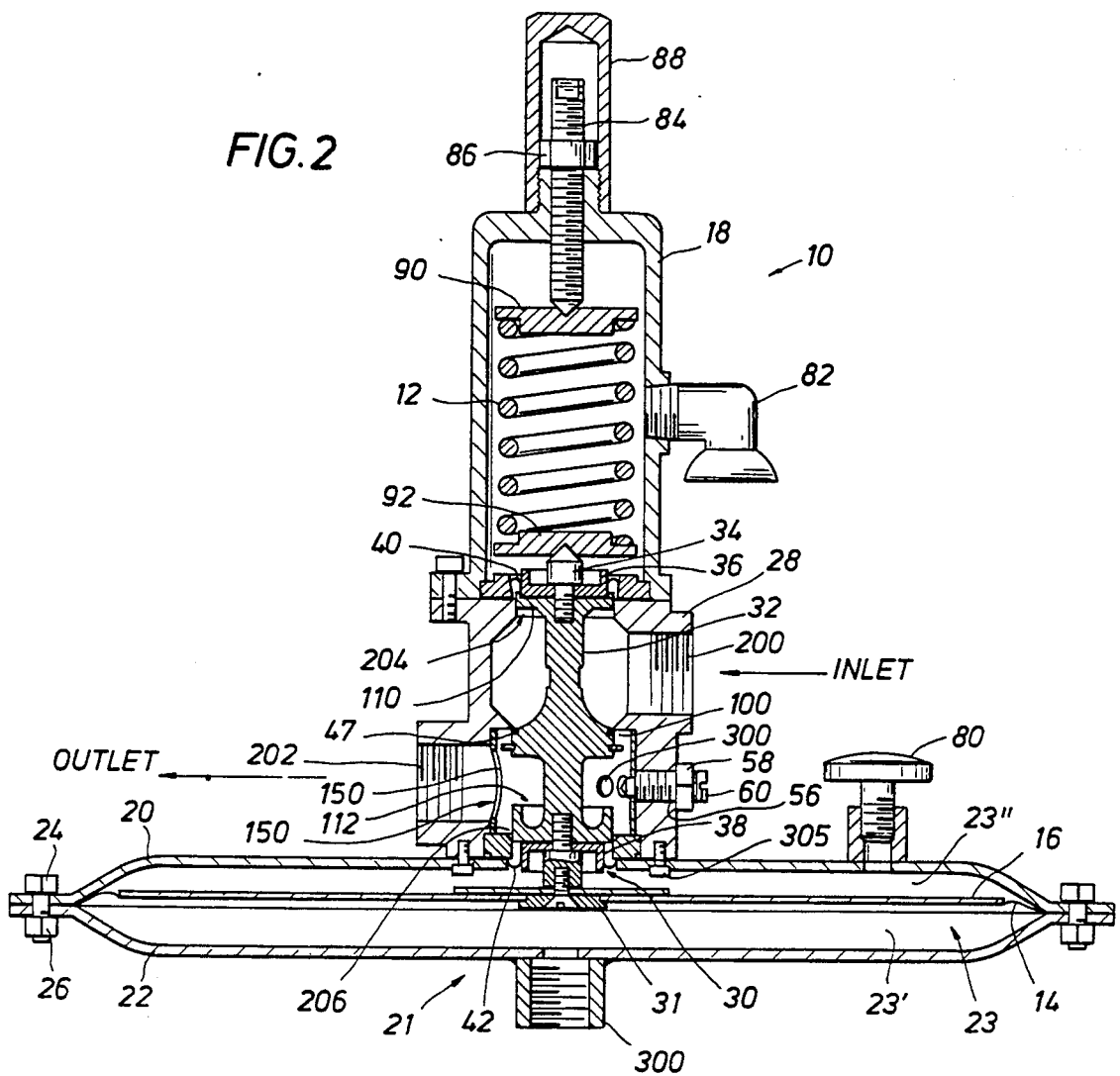
FIG. 2 shows a regulator valve of the invention, primarily in cross section.

The valve body 28 includes an inlet 200 and an outlet 202. Referring generally to FIG. 2, and especially FIGS. 3A and 3C, such inlet and outlet may be provided with threads or other connecting means with which to connect conduits to a supply of pressurized gas and to a storage tank, for example. The body 28 includes an annular seating area 100, an upper cylinder 204, and a lower cylinder 206.

Upper cylinder 204 includes a generally cylindrical guide 204' formed in body 28 and a upper plate 220 having a hole with generally outwardly tapering sides 204" as a function of increasing upward axial distance. Upper plate 220 may be fixed to the top of valve body 28 by fasteners (not shown) or by bonnet 18 as shown in FIG. 2. The smallest diameter of the walls 204" (see dimension $d_1$ of FIG. 3D) is approximately equal to the diameter of seating area 100.

Lower cylinder 206 includes a generally cylindrical guide 219 having parallel walls 206'. A plate 221, fastened to body 28 by fasteners 305, includes a hole forming general parallel walls 206". The diameter of walls 206" is greater than the diameter of seating area 100.

THE UPPER PISTON

Piston 32 includes an upper piston element 110, a lower piston element 112, and a central portion 114. A piston seat in the form of an "O" ring 47 is disposed in a recess of central portion 114. A retainer sleeve 48 maintains "O" ring 47 in place under conditions of high gas flow through the fluid flow path from inlet 200 to outlet 202 as the piston opens and controls deflection of seat 47 after lockup. A retaining ring 54, disposed in the body of piston 32, serves to maintain the position of sleeve 48.

Upper piston 110 includes an upper piston diaphragm retainer 36 which is secured to piston 32 by a threaded upper pin 34. A rollout diaphragm seal 40 is sandwiched between upper piston 110 and diaphragm retainer 36. Such rollout diaphragm seal 40 is also sandwiched between upper plate 220 and the top of body 28. The rollout diaphragm seal is secured between the body 28 and a flange of the bonnet 18 by means of fasteners.

Figure 3B:
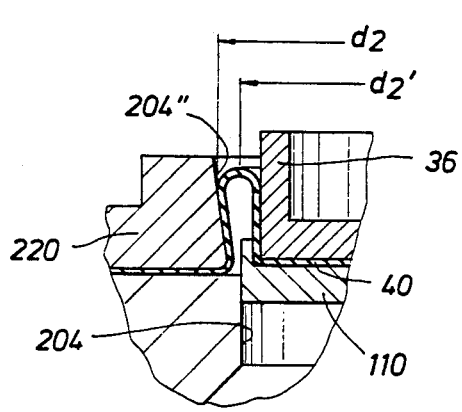
FIG. 3B shows, in an enlarged illustration, the position of a rollout diaphragm seal between outwardly tapered cylinder walls when the valve is in a closed position.

As shown in FIG. 3A, when the valve is closed, upper piston 110 is in an upward position within cylinder 204. Rollout seal 40 has moved or "rolled" upwardly along the outwardly tapered walls 204" of plate 220. When the valve is in the closed position, the effective area of the seal on which pressure in inlet 200 is acting is defined by diameter $d_2'$. Diameter $d_2'$ is approximately the mean diameter of $d_2$ and $d_3$. (See FIGS. 3B and 3D). As the valve "cracks", i.e. starts to move downwardly a small distance, the rollout seal 40 moves down the inclined walls 204" thereby decreasing the effective seal area on which inlet pressure is acting, and serves continuously to decrease closing force on piston 32 when the valve is in motion downwardly, i.e. moving to an open position. Such decreasing force aids to increase opening forces of the valve after cracking.

Figure 3D:
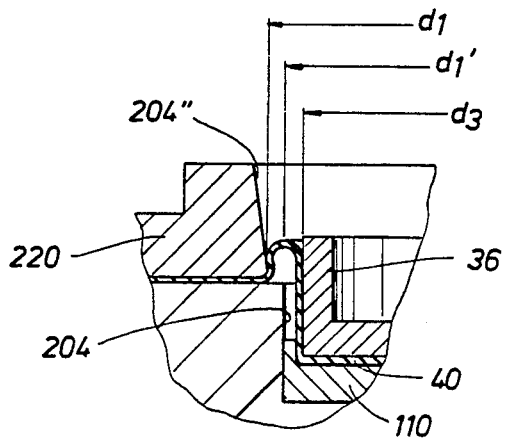
FIG. 3D shows, in an enlarged illustration, the position of such rollout diaphragm seal when the valve is in an open position.

When the valve is completely open, as in FIG. 3C, the effective area on which inlet pressure in acting is defined by mean diameter $d_1'$, as illustrated in the enlarged view of FIG. 3D. As the piston 32 begins to close, i.e. move upwardly, the effective area of rollout diaphragm seal 40 increases on which inlet pressure acts, with the result that the piston 32 tends to move upwardly until seat 47 contacts annular seating area 100.

THE SLEEVE AND LOWER PISTON

A sleeve 150 is disposed in the lower portion of the valve body 28 between the fluid flow path of the gas from inlet 200 to outlet 202. Such sleeve 150 has a plurality of holes 300 and a single gas outlet hole 300' of approximately equal diameter to outer port 202 disposed in its cylindrical wall. Holes 300 index the rotation of sleeve 150, thereby controlling the degree of opening of hole 300' relative to port 202. The lockdown screw 60 may be removed from body 28 and sleeve 150 to allow manual rotation of sleeve 150. After lockdown screw 60 has been inserted into sleeve 150, jam nut 58 inhibits inadvertent unscrewing of it. Seal 56 (see FIG. 2) seals screw 60 with respect to body 28.

The lower piston 112 includes a lift stop 44' on lift stop portion 44. Lift stop 44' prevents overtravel of piston 32. Lower piston diaphragm retainer 38 is fastened to piston 32 by lower piston pin 50. A lower piston rollout diaphragm seal 42 is secured between the lift stop portion 44 and the lower piston diaphragm retainer 38. Piston pin 50 when screwed into stop portion 44 caused retainer 38 to sandwich the seal 42 between the top of the retainer 38 and the bottom of lift stop portion 44. A plate 221, fastened to body 28 by means of screws 305 secures seal 42 to the bottom of ring 219 and the bottom of body 28.

The mean diameter $d_4$ between parallel walls 206" of plate 221 and parallel walls 206"' of retainer 38 defines the effective pressure area within sleeve 150 which acts downwardly on piston 32. Such mean diameter $d_4$ is greater than the diameter of the annular seating area 100. As a result, when the valve is open, the increased seal area of seal 42, is acted on by increased pressure within sleeve 150 caused by restricted flow through orifice 300'. As body pressure within sleeve 150 increases, this larger effective area corresponding to diameter to $d_4$ is larger than the seat 47 on annular area 100 and allows the developed pressure to be used on such unbalanced area thereby increasing downward opening force. Such effect further increased the opening force characteristic of the valve of the invention.

The sleeve 150 can be rotated to provide a restriction between the inside of sleeve 150 and outlet 202 so as to increase the pressure in the lower portion of valve body 28 during opening of the valve to provide increased opening force. Rotation of sleeve 150 allows variable pressure retention by reducing or increasing the flow area from the interior of the sleeve 150 to outlet 202 via hole 300.

THE DIAPHRAGM ACTUATOR

A diaphragm pressure actuator 21 includes upper case 20 and lower case 22 forming a cavity 23 therebetween. Bolts 24 and nuts 26 or other suitable fasteners hold the outer edges of upper and lower cases together and simultaneously fix diaphragm 14 in a sandwiched relationship about such outer edges of the upper case and lower case. Cavity 23 is divided into an upper part 23" and a lower part 23'.

A port 300 adapted to connect to a remote line from a position in a gas blanket (for example) opens to the lower cavity 23'. The diaphragm 14 is not directly connected to the diaphragm support plate 16 but is urged against the support plate by pressure entering cavity 23 and port 300. Such plate 16 has a large radius such that only a small outer annular edge of diaphragm 14 may flex. The diaphragm support plate 16 is fastened to lower piston 112 by means of screw 46 screwed into lower piston pin 50. Such pin 50 is itself threaded into the lower piston 112. A diaphragm back up plate 30 above and washer 31 below serve to broaden the connection forces at diaphragm support plate 16. The upper case 20 is fastened to the lower part of body 28 by screws 305. Bug screen 80 screens bugs, moisture, etc. from upper cavity 23" while allowing atmospheric pressure to enter such cavity.

In operation, the pressure in lower cavity 23' (remotely sensed from a gas blanket, for example) times the effective area of the diaphragm 14 produces an upward force on piston 32 which tends to close the regulator valve.

THE SET PRESSURE SPRING

A spring bonnet 18 is fixed to the top of valve body 28 by screws, welding or the like. A compression spring 12 is captured between upper spring button 90 and lower spring button 92. The upper pin 34 of upper piston 110 bears upwardly against lower spring button 92. An adjusting screw 84 bears downwardly on upper spring button 90 and is threadedly connected to bonnet 18. A nut 86 is threaded about screw 84 and serves to lock screw 84 after proper adjustment. Accordingly, turning screw 84 causes it to move down or up with respect to bonnet 18, thereby causing compression spring 12 to provide greater or less force downwardly on piston 32. Cap 88, threaded about bonnet 18, prevents inadvertent turning of screw 84. Bug screen 82 screens insects and other foreign matter from the interior of bonnet 18 while allowing atmospheric pressure therein. (Bug screen 82 may be provided anywhere about the 360° periphery of bonnet 18).

OPERATION

In operation, the regulator valve 10 is designed such that a pressure to be regulated at the port 300 in the actuator 21 is set by the force of compression spring 12. As long as the force of the pressure in lower cavity 23' of actuator 21 times the effective area of diaphragm 14 is greater than the downward force of the compression spring, the valve remains closed, because the fluid flow path from inlet 200 to outlet 202 is closed by "O" ring piston seat 47 contacting the annular seating area 100. After the pressure drops in lower cavity 23', the valve opens and stays open until sufficient gas can pass through outlet 202 to satisfy the demand of the gas blanket, for example, and such pressure can be transmitted to port 300 in order to close the valve.

ADVANTAGES AND FEATURES OF THE INVENTION

The regulator valve 10 includes a large diameter "O" ring piston seat 47. It requires minimal piston lift to develop full rated capacity. Such feature is advantageous in that it reduces required spring 12 deflection, and also aids in reducing "droop". Droop is defined as the difference in pressure between crack pressure and full open pressure, expressed in percent.

Another feature of the invention is that no seating spring or unbalanced piston area is required to achieve positive seat loading. Instead, positive seating is accomplished by using tank gas blanket pressure above set pressure acting upwardly on the total effective diaphragm area to close the piston 32 and load the seat "O" ring 47. This design achieves a seating load that increases with tank pressure and provides positive "lockup" without a tension connection between diaphragm 14 and a piston 32 or a seating spring. Lockup is defined as that pressure at which leakage through the valve is zero.

Various modifications and alterations in the described methods and apparatus will be apparent to those skilled in the art of the foregoing description which do not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. A regulator valve comprising
   a valve body (28) having an inlet (200), an outlet (202) and an annular seating surface (100) surrounding a fluid flow path between said inlet (200) and said outlet (202), said valve body having a top cylinder (204) and a lower cylinder (206),
   a piston (32) adapted for reciprocation within said valve body (28), said piston having a piston seat "O" ring (47) for seating against said annular seating surface (100), and as a result of piston reciprocation thereby alternately sealing and opening said fluid flow path, said piston having a top part (110) arranged for reciprocation within said top cylinder (204) and a bottom part (112) arranged for reciprocation in said bottom cylinder (206),
   means for sealing (40) said top part of said piston with respect to said top cylinder,
   means for sealing (42) said bottom part of said piston with respect to said bottom cylinder,
   a diaphragm actuator (21) including a case (20,22) fastened to a lower end of said valve body, said case supporting a diaphragm and diaphragm support plate (14, 16), said diaphragm support plate connected to a lower end of said piston (32), said case having a remote sensing port (300) by which pressure from a remote location acts upwardly on said diaphragm and diaphragm support plate (14, 16) to create an actuator force to urge said piston upwardly in said valve body,
   a set spring structure including a bonnet (18) fastened to an upper end of said valve body (28), said bonnet (18) supporting a compression spring (12) between an upper end of said piston and an adjustment screw (84), by which with adjustment of said screw (84) variable forces may be imposed downwardly on said piston, whereby when said upward actuator force caused by pressure beneath said diaphragm and diaphragm support plate (14, 16) is greater than downward spring force on said piston, said piston seat "O" ring (47) seals said fluid flow path by contacting said annular seating surface (100), and when said upward actuator force is less than downward spring force on said piston, said piston (32) moves downwardly such that said seating means (47) does not contact said annular seating surface (100) thereby opening said fluid flow path.

2. The regulator valve of claim 1 wherein said means for sealing said top part of said piston with respect to said top cylinder is an upper rollout seal, and said means for sealing said bottom part of said piston with respect to said bottom cylinder is a lower rollout seal.

3. The regulator valve of claim 2 wherein said top cylinder includes walls which are upwardly tapered whereby said upper rollout seal presents a greater effective sealing area to inlet pressure when said piston is in a closed position than when it is in an open position.

4. The regulator valve of claim 1 further including means for providing decreasing upward force on said piston during opening, due to pressure in said inlet, and increasing upward force on said piston during closing, due to pressure in said inlet of said piston.

5. The regulator valve of claim 1 wherein said means for sealing (42) a bottom part (112) of said piston is a lower rollout seal (42) between said lower valve cylinder (221) and said bottom portion (112) of said piston, and wherein the effective area of said lower rollout seal is greater than the a diameter of said piston seat "O" ring (47), said regulator valve further including, a rotatable sleeve (150) disposed in a lower portion of said body (28), the interior of said sleeve (150) being open to pressurized fluid from said inlet (200) when said piston (32) has moved downwardly and said piston seat (47) is not seated on said annular seating surface (100), said sleeve having an indexing orifice (300) and a flow orifice (300'), said flow orifice providing variable area fluid communication from the inside of said sleeve to said outlet (202) depending on the rotation orientation of said sleeve 150, whereby fluid flow is restricted from said outlet (202) depending on the amount of rotation of sleeve (150) thereby increasing fluid pressure inside said valve body and further increasing opening force on said piston 32 by virtue of the difference in effective pressure areas of said rollout of seal (42) and said piston seat "O" ring (47).

6. The valve of claim 5 wherein said sleeve (150) has a plurality of indexing orifices disposed in its wall and said sleeve is variably adjustable by rotating it within said valve body (28).

7. The valve of claim 6 further comprising means for locking said sleeve (150) in place with respect to said body (28), thereby preventing inadvertent rotation of said sleeve.

8. The valve of claim 1 wherein said piston seat "O" ring (47) is disposed in an annular recess of said piston (32).

9. The valve of claim 8 further comprising a piston seat "O" ring retainer sleeve (48) which fits partially outwardly about said "O" ring (47) and a retaining ring means (54) disposed in said piston (32) for retaining said sleeve (48) in place.

10. A gas blanket regulator valve adapted for regulating the gas pressure applied to a storage tank from a source of pressurized gas comprising, a valve body (28) including an inlet (200), an outlet (202) and an annular seating surface (100) surrounding a fluid flow path between said inlet (200) and said outlet (202), said valve body (28) including an upper cylinder (204) and a lower cylinder (206) disposed respectively above and below said annular seating surface (100), said outlet (202) adapted for fluid communication with a gas inlet of said storage tank, said inlet (200) adapted for fluid communication with a source of pressurized gas;

a piston structure (32) including an upper piston (110) disposed for reciprocation within said upper cylinder (204), a lower piston (112) disposed for reciprocation within said lower cylinder (206), and a piston seat means (47) disposed between said upper piston (110) and said lower piston (112), and with reciprocation of said piston body (32) within said valve body (28) cooperating with said annular seating surface (100) for closing and opening of said fluid flow path, a pressure sensitive actuator (21) including an upper case (20) and a lower case (22) arranged to form cooperating joinder surfaces at their respective outer peripheries and to form a cavity (23) between them with a diaphragm (14) disposed within said cavity (23), said diaphragm (14) being sandwiched between said joinder surfaces of said upper case (20) and lower case (22), said diaphragm having a diaphragm support plate (16) disposed over a central portion of said diaphragm thereby defining a flexible annular portion of said diaphragm (14) between an outer periphery of said support plate (16) and said joinder surfaces, said diaphragm separating said cavity (23) into a lower cavity portion (23') and an upper cavity portion (23''), said upper case (20) of said actuator (21) being fastened to a bottom end of said valve body (28), said upper case (20) having a hole (310) aligned with said lower cylinder (206) of said valve body (28), said lower piston (112) including fastening means extending through said hole (310) to said diaphragm support plate (16) for fastening said diaphragm (14) and its diaphragm support plate (16) to said piston (32), said lower case (22) of said actuator (21) including a remote sensing port (300) adapted for communicating gas pressure in said storage tank to said lower cavity portion (23') of said pressure sensitive actuator, whereby pressure in said lower cavity portion (23') acts against said diaphragm to produce an upward force, a spring bonnet (18) fastened to a top end of said valve body (28), said spring bonnet being hollow and aligned with said upper cylinder (204) of said valve body (28), a compression spring (12) disposed within said spring bonnet (18) and bearing against said upper piston (110), variable pressure setting means (86, 84) for variably forcing said compression spring (12, 90, 92) downwardly with respect to said spring bonnet (18), means for sealing (40) said upper piston (110) with respect to said upper cylinder (220) so as substantially to prevent fluid in said valve body (28) from passing into the interior of said spring bonnet (18), and means for sealing (42) said lower piston (112) with respect to said lower cylinder (221) so as substantially to prevent fluid in said valve body (28) from passing into said upper cavity portion (23″) of said pressure sensitive actuator (21), whereby when the upward force of gas pressure acting on an effective area of said diaphragm to said piston (32) is greater than the downward force of said compression spring (12) acting on said piston (32), said piston moves upwardly until said piston seat means (47) seats against said annular seating surface (100) and closes said fluid flow path from inlet (200) to outlet (202), and when the upward force of gas pressure acting on said diaphragm support plate (16) to said piston (32) is less than the downward force of said compression spring (12) action on said piston (32), said piston moves downwardly such that said fluid flow path from outlet (200) is open to said outlet (202).

11. The valve of claim 10 wherein
said means for sealing (40) said upper piston (110) with respect to said upper cylinder (220) is a variable area rollout seal.

12. The valve of claim 11 wherein said variable area rollout seal comprises the combination of said upper cylinder (204) having outwardly tapered walls (204″), and a rolling diaphragm (40) disposed between said upper cylinder and said piston (110), whereby when said piston (110) moves downwardly from a closed position such that said fluid flow path begins to open, the effective area on which inlet pressure is acting on said upper piston (110) is decreased, thereby creating increased opening force, and when said piston (110) moves upwardly from an open position such that said fluid flow path begins to close, the effective area on which inlet pressure is acting on said upper piston (110) is increased, thereby creating increased closing force.

13. The valve of claim 12 further comprising a sleeve (150) disposed in a lower portion of said valve body (28), the interior of said sleeve (150) being open to pressurized fluid from said inlet (200) when said piston (32) has moved downwardly and said piston seat means (47) is not seated on said annular seating surface (100), said sleeve having an orifice (300) disposed in its wall, said orifice providing fluid communication from the inside of said sleeve to said outlet (202), whereby fluid flow is restricted to said outlet, thereby increasing fluid pressure inside said valve body, and wherein said means for sealing (42) said lower piston (112) with respect to said lower cylinder (221) is a lower rollout seal between said lower cylinder (221) and said lower piston (112), and wherein the effective area of said lower rollout seal with respect to the diameter of said lower cylinder (221) is greater than an effective diameter of said piston "O" ring (47), whereby when fluid flow is restricted from the inside of said sleeve (150), increased fluid pressure inside said valve body causes downward force on said piston (37) by virtue of the difference in effective pressure areas of said rollout seal (42) and said piston seat "O" ring (47).

* * * * *